United States Patent
Ludois

(10) Patent No.: US 9,424,984 B2
(45) Date of Patent: Aug. 23, 2016

(54) INTEGRATED CAPACITOR AND INDUCTOR HAVING CO-LOCATED MAGNETIC AND ELECTRICAL ENERGY STORAGE VOLUMES

(71) Applicant: Wisconsin Alumni Research Foundation, Madison, WI (US)

(72) Inventor: Daniel Ludois, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 297 days.

(21) Appl. No.: 14/197,580

(22) Filed: Mar. 5, 2014

(65) Prior Publication Data

US 2015/0255209 A1    Sep. 10, 2015

(51) Int. Cl.
| | |
|---|---|
| H01F 27/40 | (2006.01) |
| H01G 4/30 | (2006.01) |
| H01G 4/005 | (2006.01) |
| H01G 4/228 | (2006.01) |
| H01G 4/008 | (2006.01) |
| H01F 3/02 | (2006.01) |
| H01F 17/04 | (2006.01) |
| H01F 17/06 | (2006.01) |

(52) U.S. Cl.
CPC .............. *H01F 27/40* (2013.01); *H01F 3/02* (2013.01); *H01F 17/045* (2013.01); *H01F 17/062* (2013.01); *H01G 4/005* (2013.01); *H01G 4/008* (2013.01); *H01G 4/228* (2013.01); *H01G 4/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,570,135 A | * | 2/1986 | Kameya | H03H 7/32 333/138 |
| 4,614,925 A | * | 9/1986 | Kane | H03H 5/02 333/174 |
| 4,837,659 A | | 6/1989 | Roshen et al. | |
| 5,039,964 A | * | 8/1991 | Ikeda | H03H 1/0007 333/181 |
| 5,111,169 A | * | 5/1992 | Ikeda | H03H 7/427 333/181 |
| 5,274,346 A | | 12/1993 | Izu et al. | |
| 5,592,134 A | * | 1/1997 | Ogata | C04B 35/491 333/185 |
| 6,346,865 B1 | * | 2/2002 | Callewaert | H03H 1/0007 333/184 |
| 6,414,568 B1 | * | 7/2002 | Matsumura | H03H 7/0115 333/177 |
| 6,469,596 B2 | | 10/2002 | Hull et al. | |
| 6,661,079 B1 | * | 12/2003 | Bikulcius | H01L 23/5223 257/531 |
| 6,853,267 B2 | * | 2/2005 | Chiba | H01F 17/0013 333/181 |
| 6,985,064 B1 | | 1/2006 | Loukas | |
| 7,436,281 B2 | | 10/2008 | Brennan et al. | |
| 7,492,240 B1 | * | 2/2009 | Cho | H03H 1/0007 333/174 |
| 8,786,395 B2 | * | 7/2014 | Li | 336/200 |
| 8,823,221 B1 | * | 9/2014 | Teter | H01L 41/12 310/26 |
| 2006/0139971 A1 | | 6/2006 | Suzuki | |
| 2008/0094860 A1 | | 4/2008 | Falk | |
| 2011/0279212 A1 | * | 11/2011 | Ikriannikov | H01F 17/0006 336/192 |
| 2012/0038434 A1 | | 2/2012 | Harrison | |
| 2013/0093731 A1 | * | 4/2013 | Scharff | G06F 1/1686 345/177 |

FOREIGN PATENT DOCUMENTS

EP    1677419 A1    5/2006

* cited by examiner

*Primary Examiner* — Thienvu Tran
*Assistant Examiner* — Angela Brooks
(74) *Attorney, Agent, or Firm* — Boyle Fredrickson, S.C.

(74) *Attorney, Agent, or Firm* — A combination capacitor and inductor employ a common volume for energy-storing electrical and magnetic fields thereby reducing the bulk of these components with respect to separate components of comparable value.

17 Claims, 4 Drawing Sheets

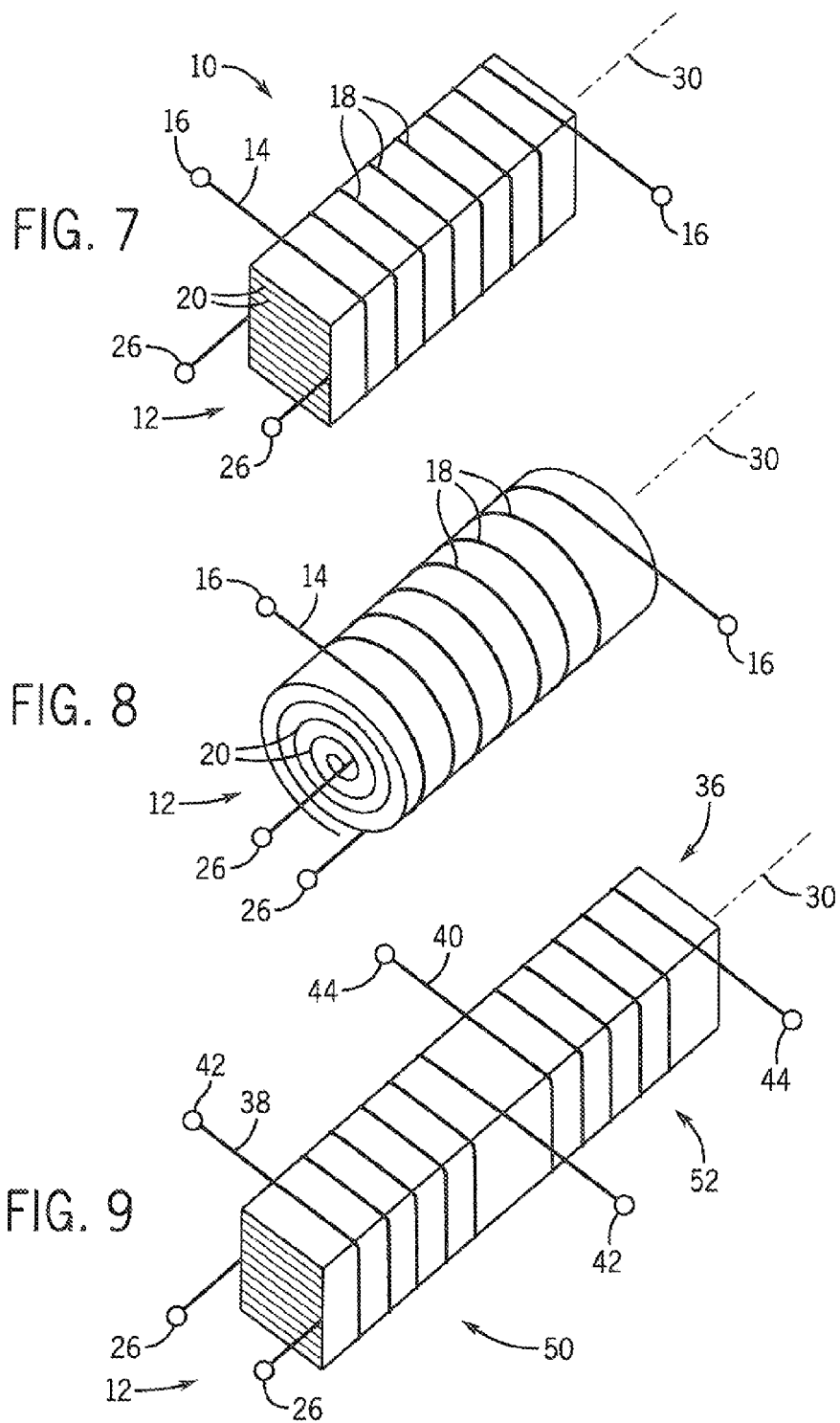

INTEGRATED CAPACITOR AND INDUCTOR HAVING CO-LOCATED MAGNETIC AND ELECTRICAL ENERGY STORAGE VOLUMES

STATEMENT REGARDING FEDERALLY SPONSORED RESEARCH OR DEVELOPMENT

N/A

CROSS REFERENCE TO RELATED APPLICATION

N/A

BACKGROUND OF THE INVENTION

The present invention relates to capacitors and inductors used in electrical circuits and in particular to an integrated capacitor and inductor sharing energy storage volumes.

Inductors and capacitors are fundamental building blocks in many common electrical devices. Unlike electrical resistors, another common building block component, inductors and capacitors can provide for electrical energy storage Inductors provide energy storage in the form of a magnetic field in the vicinity of a current-carrying conductor. The conductor is normally formed into a coil of multiple loops to concentrate the generated magnetic flux within the coil thereby increasing the inductance and energy storage. The coil may be further wrapped about a core of high magnetic permeability, such as a ferromagnetic or ferrimagnetic material, to further increase the coil's inductance.

Capacitors provide for energy storage in the form of an electric field generated between two plates of different voltage separated by an insulator. The total area between the plates and their proximity may be increased to increase the capacitance and energy storage. The insulator between the plates may further be selected to be a dielectric material, such as a plastic or ceramic, to further increase the capacitance.

In many applications of inductors and capacitors, in both low-powered and high-powered electronics, the physical size of the inductor and capacitor may be a limiting factor in reducing the size of the circuit.

SUMMARY OF THE INVENTION

The present invention provides a conductor and capacitor configured to share an energy storage volume thereby significantly reducing the bulk of the devices. Generally, the capacitor incorporates a high magnetic permeability material into its layers so that it may fit into the coil of the inductor in place of the normal core.

Specifically, in one embodiment, the invention provides a combined inductor and capacitor having an inductor providing a conductor extending between a first and second terminal point through multiple loops defining a surrounded volume, and further having a capacitor positioned within the surrounded volume and providing a capacitor structure including opposed conductive plates attached respectively to a third and fourth terminal and an insulator separating the opposed conductive plates. A high magnetic permeability material is distributed within the capacitor structure being one or both of a ferromagnetic and ferrimagnetic material.

It is thus a feature of at least one embodiment of the invention to provide a compact package including both a capacitor and an inductor by implementing an inductor core with the capacitive element.

The high permeability material may be distributed in a plurality of layers in the capacitor structure.

It is thus a feature of at least one embodiment of the invention to provide a simple method of integrating high permeability material into a capacitor structure during manufacture.

The high permeability material may be iron or an iron alloy laminated with a nonferrous metal.

It is thus a feature of at least one embodiment of the invention to permit a flexible combination of ferrous and nonferrous metals to provide both conduction and high permittivity in the conductive plates of the capacitor.

The high magnetic permeability material may be a plurality of granules incorporating inter-granular gaps of low magnetic permeability.

It is thus a feature of at least one embodiment of the invention to promote magnetic energy storage of the inductor within the same surrounded volume as the electrostatic energy storage of the capacitor.

The capacitor structure and the surrounded volume may be toroids.

It is thus a feature of at least one embodiment of the invention to provide a form factor providing a reduced surface to volume.

The conductive plates and insulator may be wound in a spiral.

It is thus a feature of at least one embodiment of the invention to provide a simple fabrication method for the combined inductor and capacitor.

The capacitor plates may extend substantially parallel to an axis of a magnetic field generated by the inductor when current passes through the inductor.

It is thus a feature of at least one embodiment of the invention to minimize eddy current conduction in the capacitor plates caused by fluctuating magnetic fields of the inductor.

The first and second terminals may be electrically separate from the third and fourth terminal.

It is thus a feature of at least one embodiment of the invention to provide an independently accessible capacitor and inductor for maximum flexibility in incorporating the capacitor and the inductor into different circuits.

These particular objects and advantages may apply to only some embodiments falling within the claims and thus do not define the scope of the invention.

BRIEF DESCRIPTION OF THE DRAWINGS

FIG. 7 is a perspective view of an alternative embodiment to that of FIG. 1 showing a linear form factor;

FIG. 8 is a perspective view of an alternative embodiment to FIG. 7 showing a spiral capacitor plate configuration;

FIG. 9 is a figure similar to that of FIG. 7 showing an embodiment of the invention producing a combination capacitor and transformer;

DETAILED DESCRIPTION OF THE PREFERRED EMBODIMENT

Figure 1:
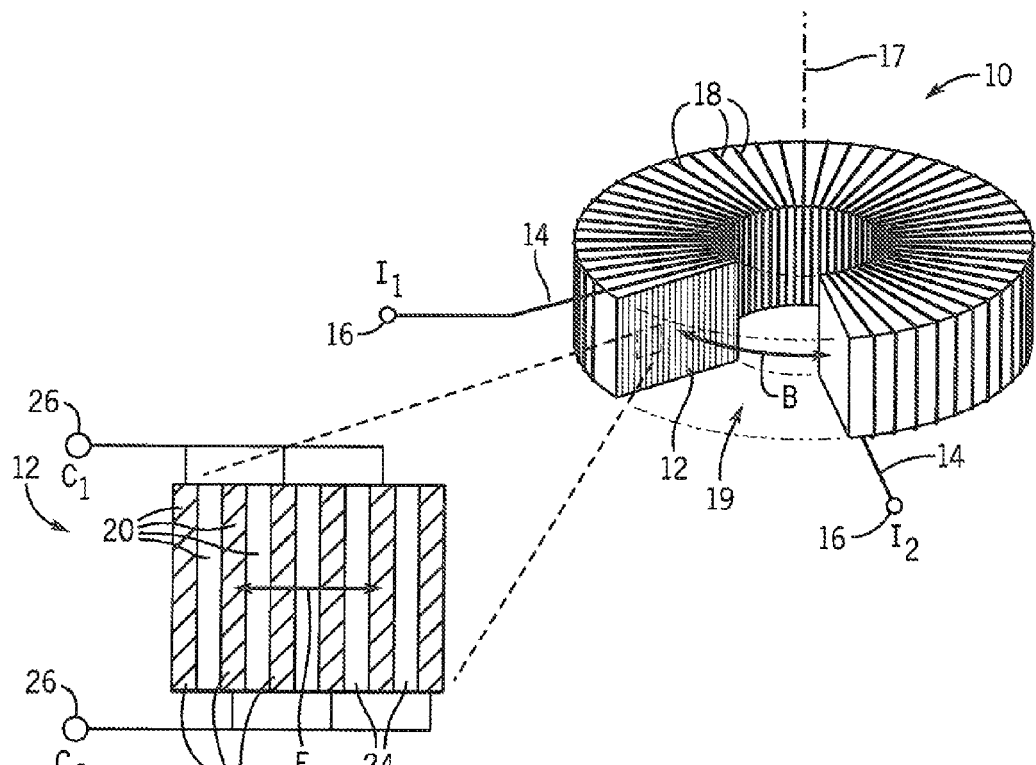
FIG. 1 is a perspective view of a first embodiment of the present invention having a toroidal form factor, the view providing a partial cutaway and an expanded cross-section of a capacitor layer structure.

Referring now to FIG. 1, an integrated capacitor inductor unit 10 of the present invention, in one example, may provide a toroidal core 12 having a. generally rectangular cross-section, the latter cross-section which when swept in a circle about the toroid axis 17 defines a core volume 19.

The toroidal core 12 may be wrapped with a conductor 14 leading from a first terminal 16 (designated $I_1$) and passing, in each of multiple loops 18, through a center opening of the toroidal core 12 and around its outer periphery to terminate at a second terminal 16 (designated $I_2$). The loops 18 together form a solenoid around the core volume 19 so that electrical current passing through the conductor 14 from one terminal 16 to the other terminal 16 will generate a circumferential magnetic field B of flux lines passing through the core volume 19 and circling around the axis 17.

The toroidal core 12 comprises a number of planar layers 20 each extending circumferentially along and around axis 17 in height and length, respectively. Generally the planar layers 20 may be wound about a cylindrical form describing the center opening of the toroidal core 12 in a spiral outward to the outer circumferential periphery of the toroidal core 12 to provide a laminated structure.

The planar layers 20 include conductive plates 22 separated by interleaving insulating layers 24. Alternate conductive plates 22 may be attached to a first terminal 26 (designated $C_1$) and the remaining conductive plates 22 attached to a second terminal 26 (designated $C_2$). As such, the conductive plates 22 form opposite plates of a capacitor each separated by an insulating layer 24 so that voltage applied to the terminals 26 will generate a radial electric field E with field lines generally perpendicular to axis 17.

Figure 2:
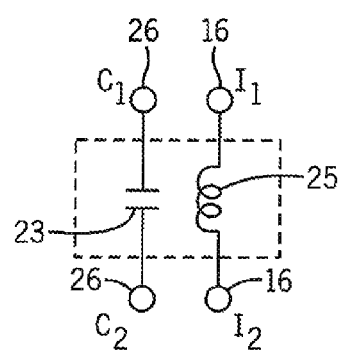
FIG. 2 is a simplified electrical schematic of the electrical equivalent of the embodiment of FIG. 1 showing an independent inductor and capacitor.

Referring now also to FIG. 2, it will be appreciated that the capacitance between terminals 26 provides a capacitor 23 electronically independent of the inductor 25 between terminals 16. Generally the current through the inductor 25 will be independent of the current through the capacitor 23 and the terminals 26 of the capacitor 23 need not be connected to the inductor 25 and may be separately accessed from the terminals 16 of the inductor 25 and vice versa. In this regard, the capacitor 23 and inductor 25 may be readily distinguished from a parasitic capacitor between inductor windings or parasitic inductance of capacitor leads.

In this embodiment, the electrical field E of the capacitor 23 will be perpendicular to the magnetic field B of the inductor 25 and the broad area of the conductive plates 22 (local surface normals) will also be perpendicular to the local magnetic field B reducing induced eddy currents in the conductive plates 22 caused by fluctuations of the magnetic field B such as may cause heating or energy loss.

Figure 3:
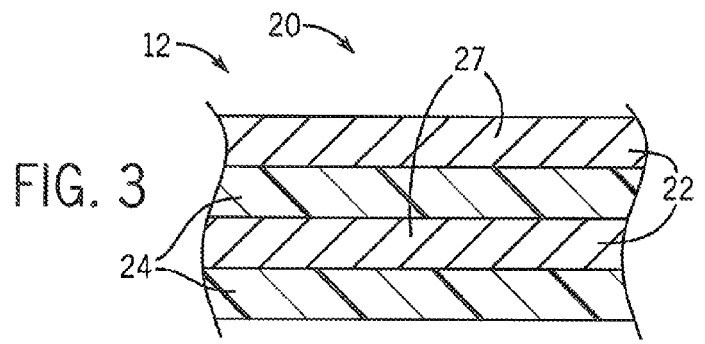
FIG. 3 is an expanded and rotated view of the cross-section of FIG. 1 showing a first embodiment using ferrous capacitor plates separated by an insulating dielectric.

Referring now to FIG. 3, in a first embodiment, the conductive plates 22 may be ferrous materials 27 such as a metallic iron or steel or other ferrous alloy or conductive ferromagnetic material. The ferrous high permeability material 27 may be ductile so that it may be wound in the annular form of toroidal core 12 as discussed above. The ferrous high permeability material 27 may provide both a conductive medium for the capacitor plates and a high permeability material increasing the inductance of the inductor 25.

The insulating layers 24 may be, for example, a polymer such as polyester, Teflon or the like to provide a dielectric material having a high relative permittivity, for example, greater than 2, to increase the capacitance between the conductive plates 22. Other dielectric materials known for use in capacitors may also be used.

Figure 4:
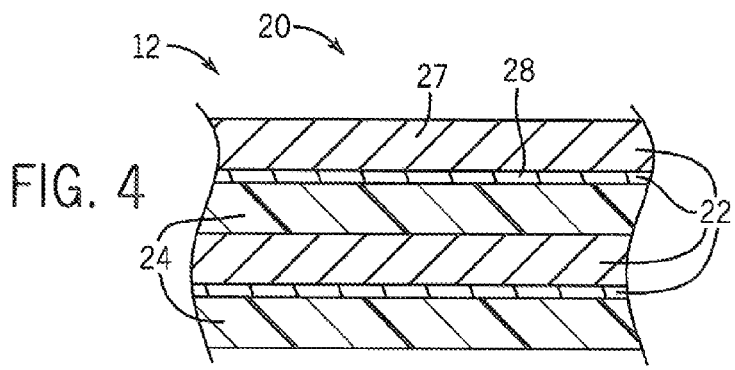
FIG. 4 is a figure similar to that of FIG. 3 showing laminated ferrous and nonferrous metals used for the capacitor plates.

Referring now to FIG. 4, in an alternative embodiment, the conductive plates 22 may be constructed of a ferrous high permeability material 27 laminated to a conductive nonferrous material 28 such as copper or aluminum together to provide a continuous conductive path between the conductive plates 22 and the terminals 26. Although only one side is shown laminated in FIG. 4, it will be appreciated that opposite sides and edges of the ferrous high permeability material 27 may be laminated with more conductive metal and other lamination orders and numbers may also be used.

Figure 5:
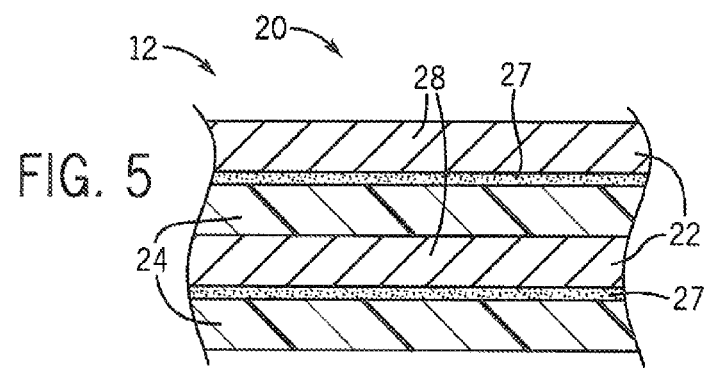
FIG. 5 is a figure similar to that of FIG. 3 showing the use of a high permeability layer interposed between capacitor plates and the insulating dielectric.

Referring now to FIG. 5, in an alternative embodiment, the conductive plates 22 may be a wholly nonferrous material such as aluminum or copper coated with a particulate or granularized high permeability material 27. The granularized high permeability material 27 provides gaps of low permeability and thus sites of magnetic energy storage. In this case, the granularized high permeability material 27 may be a ferrous material such as iron, an alloy, or an iron compound such as exhibits ferromagnetic properties for high permeability and/or a ferrite material such as magnesium and zinc ferrite or nickel-zinc ferrite, exhibiting ferrimagnetic properties and high permeability.

Alternatively, the granularized high permeability material 27 may be coated in a film on a surface of the insulating layer 24 or may be formed in its own layer to be laminated or layered between the insulating layer 24 and conductive plate 22. In each of the examples of FIGS. 4 and 5, the insulating layer 24 may be as described with respect to FIG. 3. Again although a coating of granularized type permeability material 27 is shown on only one side of the conductive plate 22 it will be understood that the coating may be placed on both sides and edges of the conductive plate 22 attached to either the conductive plate 22 or the insulating layer 24.

Figure 6:
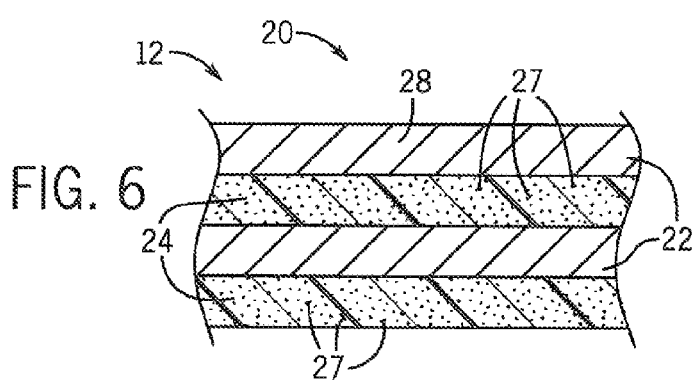
FIG. 6 is a figure similar to that of FIG. 3 showing nonferrous capacitor plates and a high permeability insulating layer.

Referring now to FIG. 6, any of the materials described with respect to FIGS. 3, 4, 5 may be used for the conductive plates 22 and the insulating layers 24 may incorporate a granularized high permeability material 27, for example, as a filler material in a polymer thermoplastic.

Generally the amount of high permeability material 27 will be such as to provide an effective amount of inductive energy storage by the inductor. Such an effective amount, for example, may increase the inductance of the inductor 25 by a factor of no less than 10 or at least no less than 2 in comparison to the inductor 25 operating without this material (for example, with an air core) but otherwise identical in construction. The high permeability material 27 will preferably have a permeability exceeding that of nickel in the same magnetic environment. As noted, the high permeability material 27 may include ferrous materials including alloys and compounds as well as ferrite materials.

Generally the insulating layer 24, as noted, will be a dielectric, having a high relative permittivity of at least 2 and be in amount and quantity such as to increase the capacitance of the capacitor 23 by a factor of no less than two in comparison to the capacitor 23 operating without this material (for example, with an air gap between conductive plates 22) but otherwise identical in construction. The qualities of the dielectric of the insulating layer 24 will typically be at least as effective as polyethylene.

Referring now to FIG. 7, the integrated capacitor inductor 10 may alternatively provide a linear core 12 that extends without curvature along an axis 30. In this case the linear core 12 may have many planar parallel rectangular layers 20 extending along the axis 30.

It will be appreciated that the linear core 12 need not use planar laminations of layers 20 but for manufacturing convenience (as shown in FIG. 8) may provide layers 20 wrapped in a spiral about axis 30 to create a cylindrical core 12. A single pair of conductors and a single pair of insulators may be wrapped in an Archimedean spiral to create multiple layers simplifying the wiring of the capacitor 23. Generally the invention may provide an inductor with an inductance of at least 0.01 μH and/or a capacitor with a capacitance of least 0.0001 μF and in some embodiments an inductor with an inductance of at least 0.1 μH and a capacitor with a capacitance of at least 0.01 μF.

Referring now to FIG. 9, it will be appreciated that the same cores 12 described above may be used for the construction of a transformer 36. In one example, the core shown in FIG. 7 may be wrapped with two conductors 38 and 40 each passing in multiple loops around the core 12 and axis 30. The conductors 38 and 40 may each terminate in separate terminals 42 (for conductor 38) and terminals 44 (for conductor 40) to provide primary winding 50 and secondary winding 52 of the transformer 36.

In these applications, the cores 12 may be characterized as described above with respect to the permeability and permittivity with one exception. While the conductors 38 and 40 (and thus primary winding 50 and secondary winding 52) are intended to be fully flux coupled through the core 12 of the capacitor 23, they will exhibit some leakage flux giving them each an inductive quality. An increase in inductance of the conductors 38 and 40, however, is not necessarily desired, so the characteristics of the core 12 applicable to inductors, in increasing the inductance of inductors, will not apply to the cores 12 used for transformers Instead the permeability of the core 12 will generally be selected to reduce the leakage flux of the transformer 36, for example, in one measure to provide a short circuit leakage reactance impedance of less than 15 percent or the 5% of typical transformers.

Figure 10:
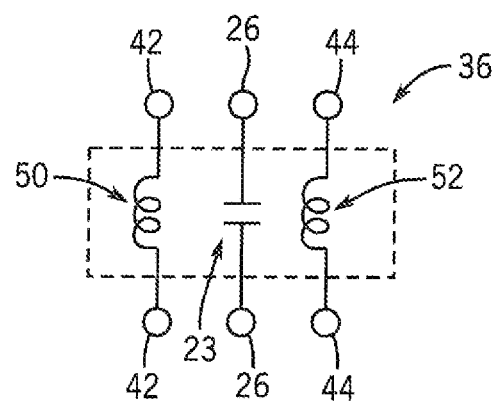
FIG. 10 is a figure similar to that of FIG. 2 showing a simplified electrical schematic of the equivalent circuit of FIG. 7.

Referring to FIG. 10 it will be appreciated that the capacitance between terminals 26 will be electrically independent of the transformer primary winding 50 operating between terminals 42 and the transformer secondary winding 52 operating between terminals 44. Further, although the number of turns of each winding 50 and 52 are shown to be approximately the same, it will be appreciated that in general the ratio between the number of turns of the primary winding 50 and secondary winding 52 will vary providing the transformer "turns ratio" defining a voltage or current "step up" or step down". It will also be appreciated that the direction of winding of the primary winding 50 and secondary winding 52 may be the same direction or opposite direction.

It will be understood that other transformer cores 12, including a toroidal core 12 such as shown in FIG. 1 and the spiral core 12 shown in FIG. 8, may also be used for a transformer 36. In addition, the invention contemplates that other traditional transformer core structures may be used including so-called E-I cores and the like while still providing capacitance as taught by this application.

Figure 11:
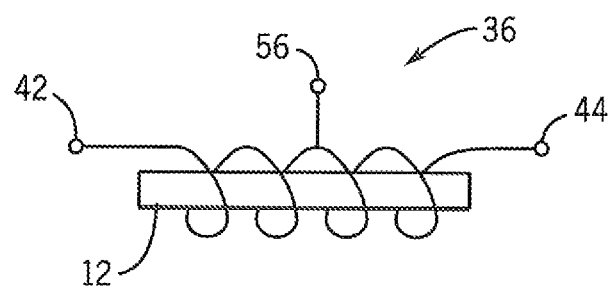
FIG. 11 is a figure similar to that of FIG. 9 showing in simplified form an alternative winding producing an auto transformer.

Referring now to FIG. 11, in one embodiment, the primary winding 50 may share a terminal 56 with the secondary winding 52 in the manner of an auto transformer or variable transformer (where the shared terminal 56 may slide along the windings to change the relative turns ratio between the primary winding 50 and secondary winding 52).

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated, by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

I claim:

1. A combined inductor and capacitor comprising:
an inductor providing a conductor extending between a first and second terminal point through multiple loops defining a surrounded volume;
a capacitor positioned within the surrounded volume and providing a capacitor structure including opposed conductive plates attached, respectively, to a third and fourth terminal and an insulator separating the opposed conductive plates;
a high magnetic permeability material distributed within the capacitor structure comprised of at least one of a ferromagnetic and ferrimagnetic material;
wherein the first and second terminals are electrically separate from the third and fourth terminals;
wherein the conductive plates and insulator are together wound in a spiral; and
wherein the high magnetic permeability material operates to increase an inductance of the inductor by a factor of no less than 2 when compared to the inductance of the inductor without the high magnetic permeability material.

2. The combined inductor and capacitor of claim 1 wherein the high permeability material provides a permeability greater than that of nickel.

3. The combined inductor and capacitor of claim 2 wherein the conductive plates comprise a material selected from the group consisting of copper and aluminum.

4. The combined inductor and capacitor of claim 1 wherein the high permeability material is distributed in a plurality of layers in the capacitor structure.

5. The combined inductor and capacitor of claim 4 wherein the high permeability material is iron or an iron alloy with a nonferrous metal coating.

6. The combined inductor and capacitor of claim 1 wherein the high magnetic permeability material is a plurality of granules incorporating inter-granular gaps of low magnetic permeability.

7. The combined inductor and capacitor of claim 1 wherein the capacitor structure and the surrounded volume are toroids.

8. The combined inductor and capacitor of claim 1 wherein the conductive plates and insulator are wound in a spiral.

9. The combined inductor and capacitor of claim 1 wherein the capacitor plates extend substantially parallel to an axis of a magnetic field generated by the inductor when current passes through the inductor.

10. The combined inductor and capacitor of claim 1 wherein the inductor provides an inductance of at least 0.01 μH and the capacitor provides a capacitance of at least 0.0001 μF.

11. A combined inductor and capacitor comprising:
an inductor providing a conductor extending between a first and second terminal point through multiple loops defining surrounded volume;
a capacitor positioned within the surrounded volume and providing a capacitor structure including opposed conductive plates attached, respectively, to a third and fourth terminal and an insulator separating the opposed conductive plates;
a high magnetic permeability material distributed within the capacitor structure comprised of at least one of a ferromagnetic and ferrimagnetic material;
wherein the first and second terminals are electrically separate from the third and fourth terminals;
wherein the conductive plates and insulator are together wound in a spiral; and
wherein the insulator is a dielectric material increasing a capacitance of the capacitor by at least a factor of two when compared to the capacitor without the dielectric material.

12. The combined inductor and capacitor of claim 11 wherein the insulator is a polymer material.

13. The combined inductor and capacitor of claim 11 wherein the insulator incorporates a granular high magnetic permeability material selected from the group consisting of ferromagnetic materials and ferrimagnetic materials.

14. The combined inductor and capacitor of claim 11 wherein the capacitor structure and the surrounded volume are toroids.

15. The combined inductor and capacitor claim 11 wherein the conductive plates and insulator are wound in a spiral.

16. The combined inductor and capacitor of claim 11 wherein the capacitor plates extend substantially parallel to an axis of a magnetic field generated by the inductor when current passes through the inductor.

17. The combined inductor and capacitor of claim 11 wherein the inductor provides an inductance of at least 0.01 μH and the capacitor provides a capacitance of at least 0.0001 μF.

* * * * *